Patented Oct. 4, 1938

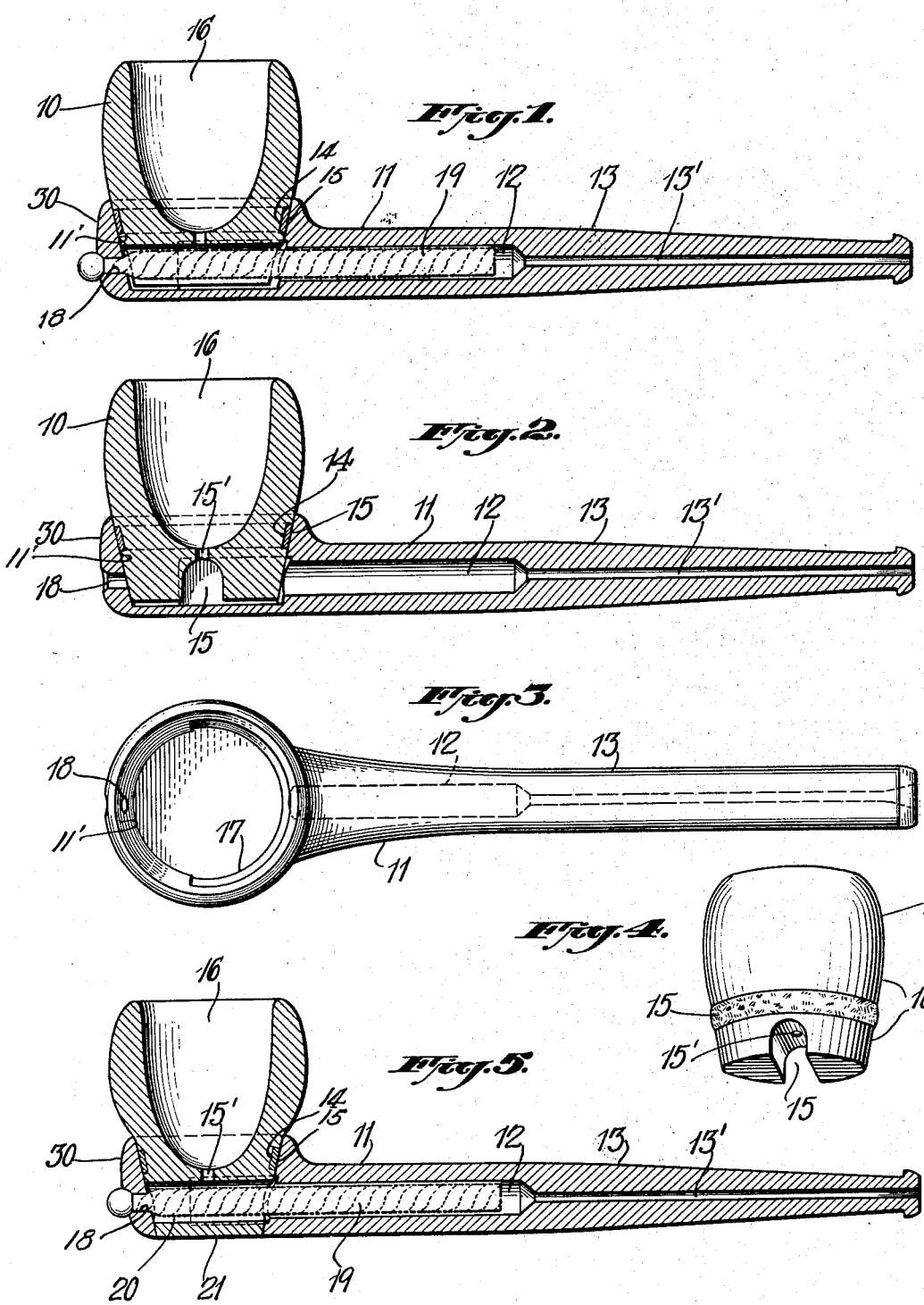

2,132,142

UNITED STATES PATENT OFFICE 2,132,142

PIPE FOR SMOKING TOBACCO

Frank M. Ashley, Great Kills, Staten Island, N. Y., assignor to Lewis Gompers, as trustee Application April 24, 1936, Serial No. 76,147

3 Claims. (Cl. 131—202)

My invention relates to pipes in which tobacco is smoked.

The object of my invention is to provide a pipe construction in which the bowl is separable from the stem and mouth-piece portion and is held in position by friction in such a manner as to permit it to be rotated relative to the stem and to be instantly removable therefrom.

A further object is to provide a construction in which a smoke filter may be used to absorb the juices released from the tobacco in the act of smoking it, and to close the opening thru which the filter is inserted in the stem when the filter is not used, by rotating the bowl relative to the stem or socket in which the bowl rests.

My construction is such that the bowls may be made of wood or any other suitable material which may be interchanged to permit a bowl of meerschaum, etc., to be used alternately with briar-wood or composition, and to permit a new bowl to be used when one is burned out.

I prefer to make the stem and mouth-piece integral as illustrated, but they may be made separately if desired.

I also prefer to make the stem and mouthpiece of bakelite or other suitable material, that can be formed by a moulding operation.

Referring to the drawing which forms a part of these specifications:

Fig. 1 is a longitudinal sectional view of a pipe embodying my invention, with a filter of preferred form in position therein.

Fig. 2 is a longitudinal sectional view with the filter removed and the bowl rotated one quarter turn relative to its position shown in Figure 1.

Fig. 3 is a plan view of the stem and mouthpiece formed integral, the end portion of the stem located adjacent the bowl being formed to provide a chamber or socket to receive the lower end of the bowl and hold it in proper relative position for use.

Fig. 4 is a perspective view of the bowl used in the construction shown in Figures 1, 2 and 3.

Fig. 5 is a longitudinal sectional view of a construction in which the bowl extends entirely thru the socket portion, the lower end of the bowl serving as the bottom side of the bore, and a filter located in the bore in position for use.

10 indicates the bowl of the pipe, which may be made of briar-wood or from moulded material suitable for use, and which by reason of its form, when made of wood, may be shaped by machine at a low cost, and also small pieces of choice briar-wood may be used which, if made with a stem formed integral in the usual manner, could not be used.

11 indicates the stem, the end of which is formed to provide an enlarged socket-chamber 11', the inner wall of which may be cylindrical, but I prefer to make it frusto-conical as illustrated. The outer wall of the socket-chamber portion of the stem is indicated by 30.

The stem 11 is formed to provide an enlarged bore 12 which extends to the relatively small passage 13' formed in the mouth-piece portion 13 in one direction, and to the hole 18 in the wall 30 in the opposite direction.

The outer lower portion of the bowl 10' is shaped to conform and fit into the socket-chamber 11, and to provide for unequal expansion between the bowl and wall of the socket, I prefer to form an annular groove 14 in the bowl and fit a cork ring 15 therein which assists in holding the bowl firmly in position, even tho the wall of the bowl does not fit perfectly in the wall of the chamber.

In Figures 1, 2 and 3, the under side of the bowl is provided with a transversely extending slot 15, preferably of larger cross section than the diameter of the bore 12, and a small hole 15' provides a passage for the smoke from the chamber 16 to the slot 15.

In each of the constructions in which a filter is to be used, a semi-circular recess 17 is formed in the inner wall to permit the smoke to pass from the chamber 16 to the bore 11 when the bowl is in the position shown in Figure 2.

The hole 18 is of less diameter than that of the bore 12 and is formed in the wall 30 in alignment with the bore in the stem, and the outer end of a filter 19 rests in the hole and closes it, as illustrated, and extends therefrom into the bore nearly to the passage 13' formed in the mouthpiece.

The filter is of less diameter than that of the bore to permit smoke to pass over it, but in doing so, the heated air carrying the smoke and moisture extracted from the tobacco in burning, is cooled and deposits the moisture on the filter which absorbs it, thus permitting the smoke only to pass thru the passage 13'.

When a filter is not available, the bowl may be rotated to the position shown in Figure 2, thus closing the hole 18 without closing the passage leading from the chamber 16 to the recess 17 and thence to the bore 12, as will be readily understood.

One reason for having the lower end of the bowl extend below the upper side of the bore is to provide a large surface for frictional engagement between the bowl and wall of the socket without increasing the height of the socket wall 30 more than is necessary to firmly hold the bowl by friction.

The only difference between the construction shown in Figures 1 and 2, and that shown in Figure 5, is that in Figure 5, the bowl is provided with a cylindrical passage 20 instead of a slot 15, and that the bottom end 21 of the bowl is exposed and forms the lower wall of the chamber 11'.

The construction is such that a high grade pipe may be made at a low cost.

The cost of the filters is low, they being made from a part of an ordinary pipe cleaner such as is sold generally on the market.

Having thus described my invention I claim as new:

1. A pipe of the character described comprising a mouth-piece and a stem extending therefrom and formed to provide a socket at one end thereof, said stem having a bore formed therein leading to said socket, said socket having formed in its wall a groove constituting substantially half of an annulus, said groove being in permanent open communication with the bore in the stem, and a bowl held in said socket and formed with a chamber for holding tobacco and with a transverse passage formed below said chamber forming a continuation of the bore in the stem and being in open communication with the said groove.

2. A pipe of the character described comprising a mouth-piece and stem, the stem formed to provide a socket at one end thereof, said stem having a bore leading from the mouth-piece to said socket and being straight throughout its length, said socket having formed in its wall a groove constituting substantially half of an annulus, said bore opening into the said groove; and a bowl having an inclined side wall formed to fit into said socket and held therein by friction, and having a chamber for tobacco, and having a transverse passage formed below said chamber in alignment with the bore of the stem; said stem having a hole in its outer end in open communication with said bore in the stem when the bowl is in one position of rest and closed by the bowl when in another position, said transverse passage constituting a receiving means for a portion of a filter when said bowl passage is positioned in substantial alignment with the bore of the stem.

3. A pipe consisting of a stem having a mouth-piece end and an end constituting a bowl-embracing and -supporting part provided with an opening therein, said stem having a bore communicating with the opening and of substantial length, a shorter bore of less diameter than the first bore in axial alignment with and extending from the opening to the exterior of the bowl end of the stem, and a bowl positioned in the opening and having a bore in axial alignment with the stem bores and a passage communicating with the chamber for holding tobacco, said bowl being readily rotatable within the stem and adapted to form a closure for the last named bore of the stem, and a filter normally of greater diameter than the small bore of the stem and of less diameter than the first named bore of the stem positioned in the three bores that are axially aligned whereby the small bore maintains the filter in a compressed condition and provides a closure for the small bore.

FRANK M. ASHLEY.